US007753998B2

(12) United States Patent
Schultz et al.

(10) Patent No.: US 7,753,998 B2
(45) Date of Patent: Jul. 13, 2010

(54) LIQUID POLISHING COMPOSITION AND KIT

(75) Inventors: Michael A. Schultz, Lockport, IL (US); Frederic W. Joseph, II, Orland Park, IL (US); Michael A. Deddo, Westmont, IL (US)

(73) Assignee: Turtle Wax, Inc., Willowbrook, IL (US)

( * ) Notice: Subject to any disclaimer, the term of this patent is extended or adjusted under 35 U.S.C. 154(b) by 363 days.

(21) Appl. No.: 11/392,393

(22) Filed: Mar. 29, 2006

(65) Prior Publication Data

US 2007/0238838 A1   Oct. 11, 2007

(51) Int. Cl.
B32B 27/00   (2006.01)
(52) U.S. Cl. .......................................... 106/3
(58) Field of Classification Search ................ 106/3
See application file for complete search history.

(56) References Cited

U.S. PATENT DOCUMENTS

| | | | | |
|---|---|---|---|---|
| 4,665,116 | A * | 5/1987 | Kornhaber et al. | 524/268 |
| 6,506,715 | B1 * | 1/2003 | Schultz et al. | 510/189 |
| 2004/0180800 | A1 * | 9/2004 | McMahan | 510/201 |
| 2005/0079987 | A1 * | 4/2005 | Cartwright et al. | 510/296 |

OTHER PUBLICATIONS

Silicone Polishes & Specialties for Household Care. GE Silicones, 2001.*
SF1642 MSDS. Momentive Performance Materials.*

* cited by examiner

*Primary Examiner*—Roy King
*Assistant Examiner*—Yoshitoshi Takeuchi
(74) *Attorney, Agent, or Firm*—Olson & Cepuritis, Ltd.

(57) ABSTRACT

A liquid polishing composition of the invention suitable for polishing an automobile and the like comprises about 0.01 to about 3 percent by weight of at least one silicone-based wax, about 0.20 to about 10 percent by weight of poly(alpha olefin) compounds including about 0.1 to about 5 percent by weight of at least one hyperbranched poly(alpha olefin), about 6 to about 60 percent by weight of at least one polydimethylsiloxane silicone fluid, about 1 to about 20 percent by weight of at least one volatile cyclic silicone, about 0.25 to about 3 percent by weight of at least one amino-functional silicone, about 0.01 to about 5 percent by weight of at least one UV absorber, and a petroleum-based carrier therefor. The liquid polishing composition can be packaged together with a microfiber polishing cloth in the form of a polishing kit. The liquid polishing composition provides a long lasting showroom finish and can be used directly on rubber, vinyl, and plastic components without leaving a white residue, commonly associated with conventional polishing compositions.

22 Claims, 1 Drawing Sheet

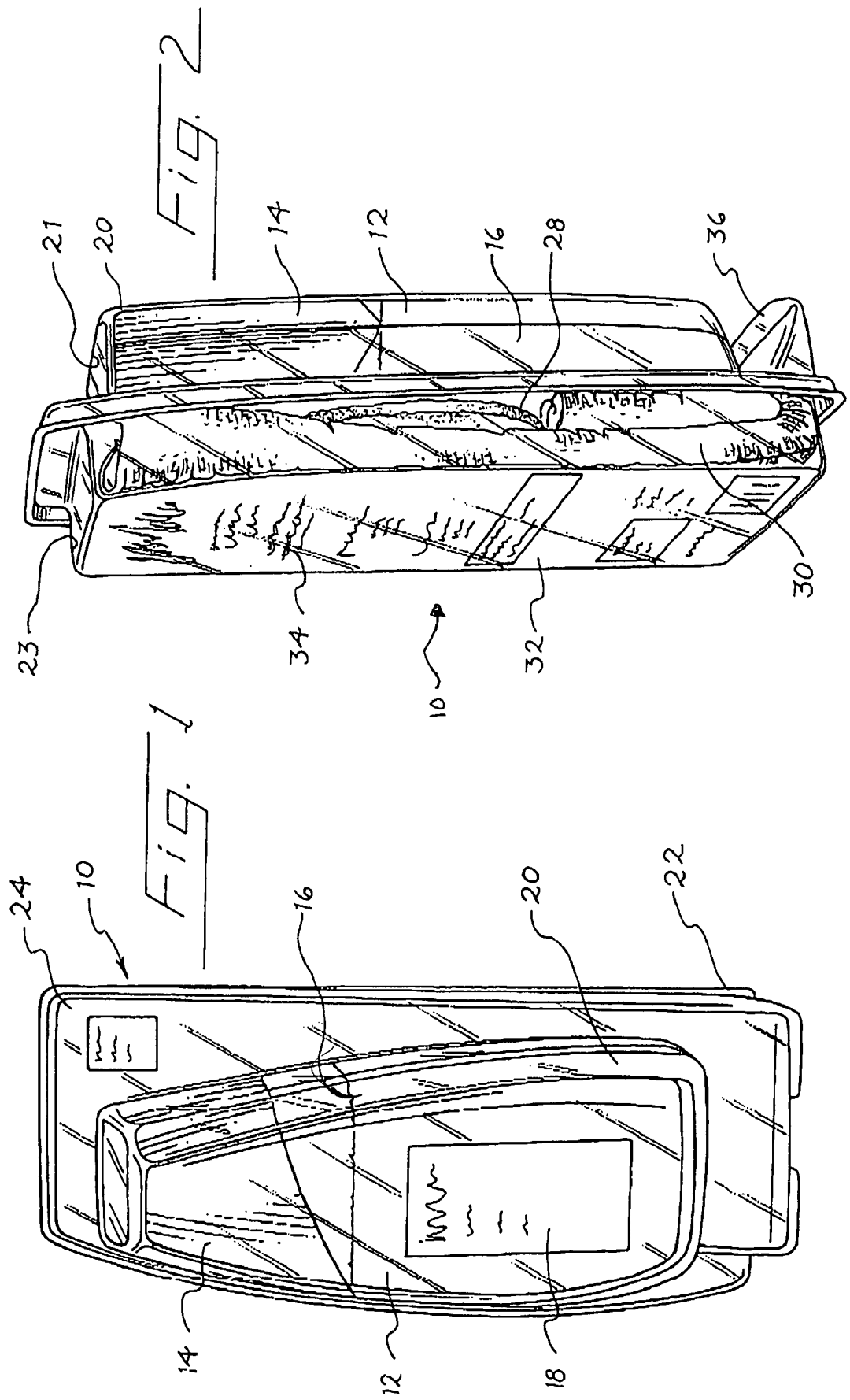

LIQUID POLISHING COMPOSITION AND KIT

FIELD OF THE INVENTION

This invention relates to a composition and kit suitable for polishing a painted exterior surface of a car, boat, motorcycle, bicycle, and the like. More particularly, this invention relates to a liquid polishing composition, and to a polishing kit including the liquid polishing composition packaged together with a microfiber polishing cloth.

BACKGROUND OF THE INVENTION

Conventional automotive polishing compositions, which are typically wax and/or silicone-based emulsions and pastes, commonly leave an unsightly white residue on polymeric automotive body components (e.g., plastic, vinyl, or rubber surfaces). Accordingly, care should be taken when applying such conventional products to avoid getting the polishing composition on polymeric surfaces. In many cases, the residue is not immediately visible, but rather turns up over time, after exposure to car washes, rain or prolonged exposure to sunlight. Even when care is taken to immediately wipe off conventional polishing compositions from plastic surfaces, the residue problem can still appear over time.

In addition, many automotive polishes cannot be applied in direct sunlight or on hot surfaces, due to undesirably rapid drying. Thus, it is generally recommended that automotive polishes be applied in the shade, and preferably when the automobile surface is relatively cool. This can be inconvenient for consumers who do not have ready access to a shady, yet sufficiently well lighted area to apply the polish, or in climates having relatively high temperatures.

Accordingly, there is an ongoing need for a polishing composition that can be applied to polymeric as well as painted metal surfaces without leaving an unsightly residue thereon, and which can be applied in direct sunlight and on hot surfaces. The liquid polishing compositions of the present invention fulfill this need.

SUMMARY OF THE INVENTION

A liquid polishing composition of the invention is suitable for polishing an a painted exterior surface of a car, boat, motorcycle, bicycle, and the like. The composition comprises about 0.01 to about 3 percent by weight of at least one silicone-based wax, about 0.20 to about 10 percent by weight of poly(alpha olefin) compounds that include about 0.1 to about 5 percent by weight of at least one hyperbranched poly(alpha olefin), about 6 to about 60 percent by weight of at least one polydimethylsiloxane silicone fluid, about 1 to about 20 percent by weight of at least one volatile cyclic silicone, about 0.25 to about 3 percent by weight of at least one amino-functional silicone, about 0.01 to about 5 percent by weight of at least one UV absorber, and a petroleum-based carrier therefor. The foregoing percentages are based on the total weight of the polishing composition.

Preferably, the petroleum-based carrier is an anhydrous hydrocarbon fluid (e.g., a liquid hydrocarbon solvent, such as petroleum distillates, mineral spirits, and the like), such that the composition is a clear, transparent solution. Optionally, the petroleum-based carrier can be an oil and water emulsion comprising a hydrocarbon fluid, water, and an emulsifying surfactant. The compositions of the invention can be clear (i.e., transparent), opaque, or semitransparent solutions or emulsions, and can include a silicone-free wax (e.g., carnauba, montan, paraffin wax, and the like) in addition to the silicone-based wax component. Clear polishing solutions are preferred.

The polydimethylsiloxane components provide a high-gloss, durable shine to plastic and painted metal surfaces. In the liquid polishing compositions of the invention, the amino-functional silicone and silicone-based wax components provide strength, durability, and water resistance to the resulting wax and silicone film after application to a surface; the poly(alpha olefin) component provides wax-like protection and promotes uniform shine and polish deposition, the volatile silicone component provides ease of application and helps control drying time; while the petroleum-based carrier provides chemical cleaning, controls the deposition of the various ingredients of the composition, and provides for easy removal of excess polishing composition.

The liquid polishing composition is applied to a clean, dry surface (e.g., an automotive exterior surface) with an absorbent applicator, such as a sponge, cloth, or mitt. The composition can be applied to all exterior metal, rubber, and plastic surfaces, even in direct sunlight, and even if the surface is hot. After the surface has been coated with the polishing composition, the coated surface is allowed to dry until a translucent, hazy film is formed. The hazy film is then wiped off with a soft cloth, preferably with a microfiber cloth, and then lightly buffed to a brilliant, showroom-like shine. Advantageously, the liquid polishing composition of the invention polishes polymeric (e.g., rubber, vinyl, and plastic) surfaces as well as metal surfaces, and does not leave behind a white residue on polymeric components. In addition, the liquid polishing compositions of the invention typically can polish an automobile with a relatively smaller quantity of polishing composition per unit area than most conventional automotive polishes.

Another aspect of the present invention is a polishing kit comprising a liquid polishing composition of the invention in a sealed container packaged together with a microfiber cloth and instructional indicia describing how to polish painted surface with the composition. The kit can also include a polish applicator, if desired.

BRIEF DESCRIPTION OF THE DRAWINGS

In the drawings, FIG. 1 is a front perspective view of an automotive polishing kit of the invention.

FIG. 2 is perspective view of the polishing kit shown in FIG. 1, showing the rear and one side of the kit.

DETAILED DESCRIPTION OF PREFERRED EMBODIMENTS

As used herein and in the appended claims, the term "silicone" and grammatical variations thereof means a polymer having the general formula $(R_n SiO_{((4-n)/2)})_m$ wherein n is between 0 and 3 and m is 2 or greater, and R is alkyl or aryl, as defined in *Silicone Compounds Register and Review*, 5th Edition, R. Anderson, G. L. Larson and C. Smith Eds., Hüls America Inc., Piscataway, N.J., p 247 (1991). A polydimethylsiloxane is a silicone in which each repeating silicone unit includes two methyl groups (i.e., R=methyl and n=2). Silicones can be linear or branched. The term "amino-functional silicone" and grammatical variations thereof means a silicone as defined above, wherein the alkyl or aryl group is substituted with a primary, secondary or tertiary amino group. The term "silicone-based" as used herein means a material that contains a silicone component or portion.

When referred to herein, the viscosity of a liquid component of the invention is quoted as a kinematic viscosity in centistokes (cSt), measured at 25° C. (77° F.), unless otherwise specified.

The liquid polishing composition of the invention comprises about 0.01 to about 3 percent by weight of at least one silicone-based wax. Preferably, the silicone-based wax comprises a silicone alkyl copolymer. The silicone alkyl copolymer preferably is present in the polishing composition in an amount in the range of about 0.01 to about 0.5 percent by weight. In a preferred embodiment, the silicone-based wax includes a silicone alkyl copolymer and a graft copolymer of silicone glycol and carnauba wax (siliconized carnauba wax). Preferably, the siliconized carnauba wax is present in the composition in an amount in the range of about 0.005 to about 3 percent by weight. Suitable silicone-based waxes are commercially available from a variety of sources, such as Burlington Chemical Co., Inc., Burlington, N.C., GE Silicones of Waterford, N.Y., and Dow Corning Corporation of Midland, Mich. A preferred siliconized carnauba wax is BURCOSIL® CAR, available from Burlington Chemical Co., Inc. A preferred silicone alkyl copolymer is SF-1642, available from GE Silicones.

The liquid polishing composition also comprises about 0.2 to about 10 percent by weight of poly(alpha olefin) compounds, i.e., polymers of alpha olefin monomer units that comprise at least about 10 carbons (i.e., polymers or copolymers of 1-decene, 1-dodecene, 1-tetradecene, and the like, preferably 1-decene). The poly(alpha olefin) compounds include about 0.1 to about 5 percent by weight hyperbranched poly(alpha olefin) compounds. Hyperbranched poly(alpha olefin) compounds differ from conventional poly(alpha olefin) polymers in that the hyperbranched polymers include branches off of branches and also include quaternary carbons, which are not found in conventional poly(alpha olefin) polymers. The poly(alpha olefin) component of the present liquid polishing composition can be constituted by a blend of ordinary poly(alpha olefin) compounds and hyperbranched poly(alpha olefin) compounds. Suitable conventional poly(alpha olefin) compounds include the DURASYN® brand polymers of $C_{10}$ or greater alpha olefins such as DURASYN®166 available from Innovene, Chicago, Ill. Suitable hyperbranched poly(alpha olefin) compounds include VYBAR® brand polymers of $C_{10}$ or greater alpha olefins, such as VYBAR® 825 available from BakerPetrolite, Sugar Land, Tex.

In addition, the liquid polishing compositions of the invention comprise about 6 to about 60 percent by weight of at least one polydimethylsiloxane silicone fluid. Polydimethylsiloxane silicone fluids useful in the liquid polishing compositions of the present invention preferably are selected from polydimethylsiloxanes having a kinematic viscosity in the range of about 20 centistokes (cSt) to about 60,000 cSt. Preferably, the polydimethylsiloxane component comprises a blend of several different viscosity silicones, e.g., blends that include a polydimethylsiloxane having a kinematic viscosity of about 350 cSt, a polydimethylsiloxane having a kinematic viscosity of about 1,000 cSt, a polydimethylsiloxane having a kinematic viscosity of about 10,000 cSt, and a polydimethylsiloxane having a kinematic viscosity of about 60,000 cSt. In preferred embodiments, the respective weight ratio of polydimethylsiloxanes having viscosities of 350, 1,000, 10,000, and 60,000 cSt is about 7:3:3:1.

The amount of 350 cSt polydimethylsiloxane in the compositions preferably is in the range of about 5 to about 15 percent by weight. The amount of 1,000 cSt polydimethylsiloxane in the composition preferably is in the range of about 0.5 to about 10 percent by weight. The amount of 10,000 cSt polydimethylsiloxane in the composition preferably is in the range of about 0.5 to about 10 percent by weight. The amount of 60,000 cSt polydimethylsiloxane in the composition preferably is in the range of about 0.1 to about 2.5 percent by weight.

Suitable polydimethylsiloxane silicone fluids are commercially available from a variety of manufacturers such as GE Silicones of Waterford, N.Y. and Dow Corning Corporation of Midland, Mich.

The amino-functional silicone component constitutes about 0.25 to about 3 weight percent of the liquid polishing composition of the present invention. Preferably, the amino-functional silicone is present in the composition in an amount in the range of about 0.5 to about 1 percent by weight.

Amino-functional silicones suitable for use in the present invention include silicone polymers that contain primary, secondary or tertiary amino functional groups. Preferably, the amino-functional silicones are copolymers of dialkylsiloxane and amino-functional siloxane comonomers. The preferred amino-functional silicones contain about 1 to about 50 mole percent of amino-functional siloxane comonomer units, more preferably about 1 to about 30 mole percent of amino-functional siloxane comonomer units. These silicone fluids can contain starting materials and reaction by-products in addition to the amino-functional polydialkylsiloxane. Suitable amino-functional silicones include those disclosed in co-owned U.S. Pat. No. 4,665,116 to Kornhaber et al., the relevant disclosures of which are incorporated herein by reference.

A useful amino-functional polydialkylsiloxane, for example, can be derived from the equilibration of a polydialkylsiloxane having a viscosity of about 1 to about 30,000 cSt with an amino-functional silane or siloxane in the presence of a basic catalyst. Typical polydialkylsiloxanes useful for the preparation of amino-functional silicones include cyclic dimethysiloxane oligomers having about 3 to about 10 dimethylsiloxane monomer units.

The amino-functional silanes or siloxanes, which are reacted with the polydialkylsiloxanes can be represented by the general formula (I):

$$[QSi(G_a)O_{((3-a)/2)}]_x Z_b \qquad (I)$$

wherein G represents the radicals R, OR", NR'$_2$, or OSiR$_3$ in which R is $C_1$-$C_{18}$ alkyl or $C_6$-$C_{10}$ aryl, R' represents hydrogen or monovalent hydrocarbon radicals having 1 to about 18 carbon atoms, R" is a substituted or unsubstituted divalent $C_1$-$C_{18}$ hydrocarbon radical, a substituted or unsubstituted divalent oxyalkylene group in which the oxygen provides an ether linkage, or an unsaturated divalent $C_4$-$C_{18}$ hydrocarbon radical; Q represents the radicals:

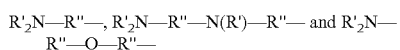

R'$_2$N—R"—, R'$_2$N—R"—N(R')—R"— and R'$_2$N—R"—O—R"—

Z is a radical selected from the group consisting of R$_3$SiO$_{0.5}$, and R'$_2$NR"O$_{0.5}$ in which R, R' and R" are the same as above, "a" has a value of 0 to 3; "b" has a value of 0 to 3; and "x" has a value of about 1 to 20,000. Preferably, R' is hydrogen.

Illustrative divalent radicals represented by R" are hydrocarbon radicals having from 2 to 18 carbon atoms such as ethylene, trimethylene, tetramethylene, hexamethylene, octamethylene; oxyalkylene group radicals having the formulas: (—OC$_2$H$_4$—)$_r$, (—OC$_2$H$_4$OCH$_2$—)$_r$ and (—OC$_3$H$_6$—)$_r$ in which "r" has a value of about 1 to about 50, such as ethylene oxide, trimethylene oxide and polymers thereof and alkylene radicals such as vinylene, propenylene, butenylene, hexenylene and the like.

Examples of suitable amino-functional silanes include but are not limited to 2-aminoethyltriethoxysilane, 3-aminopropyltrimethoxysilane, (3-(2-aminoethylamino)propyl)methyldimethoxysilane, 6-aminohexyltributoxysilane, 6-(2-aminoethoxy)hexyltriethoxysilane, 4-(3-aminopropoxy)butyltributoxysilane, and the like.

Suitable amino-functional polydialkylsiloxanes and methods for preparing them are described in U.S. Pat. No. 3,890,269, No. 3,960,575 and No. 4,247,330 the relevant disclosures of which are incorporated herein by reference.

Preferred amino-functional silicones are polymers comprising repeating units represented by the general formula (II):

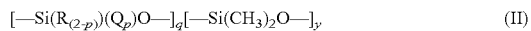

wherein Q represents the radicals:

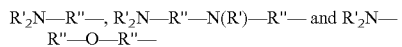

R is $C_1$-$C_{18}$ alkyl or $C_6$-$C_{10}$ aryl; R' represents hydrogen or monovalent hydrocarbon radicals having 1 to about 18 carbon atoms; R" is a substituted or unsubstituted divalent $C_1$-$C_{18}$ hydrocarbon radical, a substituted or unsubstituted divalent oxyalkylene group in which the oxygen provides an ether linkage, or an unsaturated divalent $C_4$-$C_{18}$ hydrocarbon radical; "p" has a value in the range of about 1 to about 2; "q" has value in the range of about 1 to about 2,000; and "y" has a value in the range of about 0 to about 2,000; with the proviso that the sum of "q" and "y" is at least about 15.

Examples of suitable amino-functional silicones include (2-aminoethyl)methylpolysiloxane,
(3-aminopropyl)methylpolysiloxane,
(2-aminoethyl-3-aminopropyl)methylpolysiloxane,
(3-(2-aminoethyoxy)propyl)methylpolysiloxane,
(6-aminohexyl)methylpolysiloxane,
(3-(2-aminoethoxy)propyl)methylpolysiloxane,
(3-(2-aminoethylamino)propyl)methylsiloxane,
dimethylsiloxane copolymers thereof, and the like.

A particularly preferred amino-functional polydimethylsiloxane is commercially available under the designation SF-1706 from GE Silicones, Waterford, N.Y., and is a copolymer of aminoethyaminopropylsiloxane and dimethylsiloxane, according to the manufacturer's product literature.

Other suitable amino-functional silicones are available from GE Silicones, of Waterford, N.Y., Dow Corning Corporation of Midland, Mich. and OSi Specialties, Inc. of Danbury, Conn.

The liquid polishing compositions of the invention also include about 0.01 to about 5 percent by weight of at least one UV absorbing material (i.e., a UV absorber). Examples of UV absorbers include benzotriazoles, benzophenones, and the like, and polymeric UV absorbers having a UV chromophore attached to a polymer backbone. A preferred UV absorber is a mixture of $C_7$ to $C_9$ branched and linear alkyl esters of 3-(2H-benzotriazol-2-yl)-5-(1,1-dimethylethyl)-4-hydroxybenzenepropanoic acid, which is commercially available as a 90 percent solution in isopropanol under the trade name of TINUVIN® 99, available from Ciba Specialty Chemicals, Basel, Switzerland.

The liquid polishing compositions of the invention include about 1 to about 20 percent by weight of at least one volatile cyclic silicone. Suitable volatile cyclic silicones include, without limitation, cyclotetra(dimethylsiloxane), cyclopenta(dimethylsiloxane), cyclohexa(dimethylsiloxane), and combinations of two or more of the foregoing. Preferably, the volatile cyclic silicone comprises cyclopenta(dimethylsiloxane), also known as cyclomethicone. Volatile cyclic silicones are commercially available from GE Silicones, Waterford, N.Y.

Optional components of the liquid polishing compositions include, without limitation, a silicone-free wax (e.g., carnauba, montan, paraffin wax, and the like), an auxiliary solvent (e.g., an alcohol), a non-ionic surfactant, a preservative, a neutralizing agent, a stabilizer, a viscosity modifying agent, a colorant, a fragrant oil, and the like, in an amount suitable to achieve the purpose for which the optional component was included in the composition (i.e., to solubilize a component, to modify the viscosity, to impart a fragrance or color to the composition, to stabilize or otherwise preserve the composition during storage or use, and the like). In some embodiments, the compositions further include about 0.1 to about 5 percent by weight of a silicone-free wax such as carnauba wax, montan wax, paraffin wax or a combination of two or more of the foregoing.

In some preferred embodiments, the liquid polishing composition of further includes 0.1 to about 1 percent by weight of a polydimethylsiloxane-coated polysilicate (e.g., MQ Resin, a material having Chemical Abstracts Service (CAS) Registration No. 68988-56-7), which can provide added durability to the resulting surface coating, and can provide a desirably high refractive index to the coating.

The petroleum-based carrier component can be present in any amount necessary or desirable to dissolve the other components and to provide a desired level of surface cleaning activity. For example, the petroleum-based carrier can be present in the composition in an amount of up to about 85 percent by weight, more preferably up to about 75% by weight. Typically, the petroleum based carrier will be present in an amount in the range of about 50 to about 75% by weight.

Preferably, the petroleum-based carrier is an anhydrous hydrocarbon fluid (e.g., mineral spirits, petroleum distillates, mixtures thereof, and the like). When an anhydrous petroleum-based carrier is utilized, the composition is typically a clear, transparent fluid, in which the various components of the composition are dissolved in the carrier. When a silicone-free wax component is included in the composition (e.g. about 0.1 to about 5 percent by weight of a wax such as carnauba wax, montan wax, paraffin wax, or a combination of two or more thereof), the composition may be opaque or semitransparent, depending on the amount and type of the silicone-free wax included.

Optionally, the petroleum-based carrier can be an oil and water emulsion comprising a hydrocarbon fluid, water, and an emulsifying surfactant. Surfactants suitable for emulsifying hydrocarbon fluids and water are well known in the art, and include nonionic surfactants (e.g., a glycerol fatty ester), a anionic surfactants (e.g., a neutralized morpholine oleate salt), and cationic surfactants (e.g., quaternized amine surfactants), as well as mixtures of a nonionic surfactant with an anionic or cationic surfactant.

The liquid polishing compositions of the present invention can be manufactured by mixing the various components in a suitable amount of petroleum-based carrier such as a light petroleum distillate, mineral spirits, combinations thereof, and the like. The compositions in which the petroleum-based carrier is an anhydrous hydrocarbon fluid typically are transparent and preferably colorless and of relatively low, water-like viscosity. Inclusion of a silicone-free wax may result in a composition that is opaque or semitransparent. Compositions in which the petroleum-based carrier is an oil and water emulsion may be opaque, transparent, or clear, depending on the size and concentration of the suspended emulsion droplets.

A preferred formulation of a liquid polishing composition according to the present invention is a petroleum-based solution containing about 0.01 to about 0.5 percent by weight of a silicone alkyl copolymer (a silicone-based wax), about 0.005 to about 3 percent by weight of a silicone glycol grafted carnauba wax, about 0.1 to about 5 percent by weight of a conventional poly(alpha olefin), about 0.1 to about 5 percent by weight of a hyperbranched poly(alpha olefin), about 5 to about 15 percent by weight of a 350 cSt polydimethylsiloxane, about 0.5 to about 10 percent by weight of a 1,000 cSt polydimethylsiloxane, about 0.5 to about 10 percent by weight of a 10,000 cSt polydimethylsiloxane, about 0.1 to about 2.5 percent by weight of a 60,000 cSt polydimethylsiloxane, about 0.1 to about 1 percent by weight of a polydimethylsiloxane-coated polysilicate, about 0.25 to about 3 percent by weight of an amino-functional silicone, about 1 to about 20 percent by weight of a volatile cyclic silicone, about 0.01 to about 5 percent by weight of a UV absorber (e.g., TINUVIN® 99), about 0.05 to about 0.2 percent by weight of a preservative (e.g., butylated hydroxytoluene), and a suitable amount of an optional fragrant oil, all dissolved in a petroleum-based carrier, such as a mixture of light petroleum distillates and mineral spirits.

In use, the liquid polishing composition is applied to a clean, dry surface (e.g., an automobile exterior surface) with an absorbent applicator. Preferably, the absorbent applicator is a natural or synthetic sponge, a cloth, soft fabric mitt, a synthetic sponge mitt, and the like. Unlike most conventional polishing compositions, the liquid polishing compositions of the invention advantageously can be applied to exterior metal and plastic surfaces, without leaving behind an undesirable white residue on polymeric (e.g., plastic, rubber or vinyl) surfaces. Also in contrast to conventional automotive polishes, the compositions of the invention can be applied in direct sunlight, and on hot surfaces. After the composition has been applied to the surface, the composition is allowed to dry until a translucent, hazy film is formed. The hazy film is then wiped off with a soft cloth, preferably with a microfiber cloth, and then lightly buffed to a brilliant, showroom-like shine with the cloth, or the like.

Another aspect of the present invention is a polishing kit, as shown in FIG. 1 (front perspective view) and FIG. 2 (perspective view showing the rear and one side). Kit 10 comprises container 12 having resealable closure 14 and including a predetermined quantity of liquid polishing composition 16 of the invention, preferably a quantity sufficient to polish an automobile several times (e.g., about 3 to five times). Container 12 can include label 18 identifing the composition as a liquid polish, and optionally including other promotional or instructional indicia. Container 12 is disposed within an outer package such as a transparent, clear plastic package 20, which can be sealed with an ultrasonic weld 22 around the perimeter thereof. Internal partition 24 can be provided within transparent plastic package 20, behind container 12, to create front compartment 21 (see FIG. 2) and rear compartment 23 (see FIG. 2) within package 20, such that container 12 is disposed within front compartment 21 and is visible through clear plastic package 20. Sponge-like applicator 28 and folded microfiber polishing cloth 30 are disposed within rear compartment 23. Instructional insert 32 can be disposed between the rear of clear plastic package 20 and polishing cloth 30. Instructional insert 32 preferably includes instructional indicia 34 on a surface thereof, preferably visible through clear plastic package 20.

The polishing cloth preferably is a soft, absorbent microfiber cloth preferably comprising polyester and polyamide microfibers, and including loops of fibers on the surface thereof in a form similar to terry cloth. In a preferred embodiment, the polishing cloth comprises about 80 percent polyester fiber and about 20 percent polyamide fiber, on a weight basis. Examples of materials suitable for use as a polishing cloth in conjunction with the polishing compositions of the invention include, without limitation superfine microfiber nonwoven web materials described in Canadian Patent No. 2,236,340 to Pike, the relevant disclosures of which are incorporated herein by reference, which comprise a blend of split microfibers of at least two different polymeric materials, at least one of which is a hydrophilic polymer. Other microfiber fabrics and methods of manufacture thereof are described in U.S. Pat. No. 6,110,588 to Perez et al., No. 6,977,113 to Kody et al., and No. 7,014,803 to Perez et al., the relevant disclosures of which are incorporated herein by reference.

Looped microfiber fabrics comprising about 70 to 80 percent split polyester fibers and about 20 to 30 percent split polyamide fibers are particularly useful, since such looped, split-fiber fabrics can clean surfaces without trapping soil particles within the weave of the fabric. The fine, soft nature of microfiber fabric (typically having a denier of about 0.01 to about 0.02) makes such fabrics particularly well sited for cleaning relatively delicate painted surfaces without significant surface scratching. These looped fabrics typically include upwards of about 200,000 fiber strands per square inch of fabric, and are very durable, allowing the fabric to be washed hundreds of times without significant degradation of the fabric.

Of course, clear plastic package 20 can be replaced by a conventional, opaque box, if desired. Partition 24 can be omitted if desired, as well. Instructional insert 32 can be replaced by a folded paper insert, a booklet, or any suitable instructional material, or can be omitted. The instructional material also can be placed on the exterior of container 12, such as on label 18.

The following examples illustrate preferred embodiments of the present invention and are not to be considered as limiting the scope of the appended claims.

EXAMPLE 1

Liquid Polishing Composition A

Liquid Polishing Composition A, according to the present invention, was prepared by blending the following components: about 0.025 parts by weight of a silicone alkyl copolymer (i.e., SF-1642), was dissolved in about 15 parts by weight of a light petroleum distillate solvent, then an additional amount of light petroleum distillate (about 40 parts by weight) and about 15 parts by weight of Rule 66 mineral spirits was added. About 1 part by weight of a conventional poly(alpha olefin) (i.e., DURASYN® 166), was then added, together with about 0.7 parts by weight of a hyperbranched poly(alpha olefin) (i.e., VYBAR® 825), about 0.01 parts by weight of a silicone glycol grafted carnauba wax (i.e., BURCOSIL® CAR), about 7 parts by weight of a 350 cSt polydimethylsiloxane, about 3 parts by weight of a 1,000 cSt polydimethylsiloxane, about 3 parts by weight of a 10,000 cSt polydimethylsiloxane, about 1 part by weight of a 60,000 cSt polydimethylsiloxane, about 0.25 parts by weight of a polydimethylsiloxane-coated polysilicate (i.e., MQ Resin) dispersed in a silicone fluid, about 0.5 parts by weight of an amino-functional silicone (i.e., SF-1706), about 12 parts by weight of cyclopenta(dimethylsiloxane), about 0.6 parts by weight of a fragrant oil, about 0.01 parts by weight of a UV absorber (i.e., TINUVIN® 99), and about 0.01 parts by weight of butylated hydroxytoluene as a preservative and antioxidant. The resulting composition (Composition A) was a clear, transparent solution.

Composition A was used in field tests to polish black and other dark-finished automobiles, including polymeric surfaces thereof. The resulting shine on the automobiles was judged by the individuals applying the composition and by impartial observers to be of "showroom" quality, including the shine on plastic surfaces such as bumpers and vinyl roofs. Observations of the polished automobiles over time indicated that the undesirable white residue that forms with conventional polishes on plastic surfaces was not observed with the polishing composition of the invention.

In addition, a particularly high level of shine was achieved when the composition was wiped off with, and the surface was buffed with, a microfiber polishing cloth comprising polyester and polyamide microfibers. Tests in hot weather conditions confirmed that the composition could advantageously be applied on hot surfaces and in direct sunlight.

Optionally, a portion of the light petroleum distillates and/or the mineral spirits in Composition A can be replaced by water and an emulsifying surfactant (e.g., a nonionic surfactant such as a polyglycerol fatty acid ester, an alcohol ethoxylate, and the like; an anionic surfactant such as a neutralized morpholine oleate soap and the like; or a cationic surfactant such as a quaternized amine surfactant) to afford a composition which is an oil and water emulsion, rather than an anhydrous hydrocarbon-based solution.

EXAMPLE 2

Preparation of a Polishing Kit

A polishing kit of the invention was prepared as follows. About 16 fluid ounces of the liquid polishing composition of Example 1 was dispensed into a resealable plastic container. The container included a label identifying the composition as a liquid polish. The sealed container of polishing composition was ultrasonically sealed into a clear plastic package along with a sponge-like applicator and a folded microfiber polishing cloth having an open size of about 13 by about 17 inches. The applicator and cloth were separated from the sealed container of polishing composition by a cardboard partition, which created a front compartment and a rear compartment in the package. The sealed container was displayed in the front compartment, while the applicator and the polishing cloth were disposed in the rear compartment. The partition included various promotional information printed thereon, and visible through the front compartment surrounding the sealed container of polishing composition. The package also included an instructional insert, visible through the rear compartment, and mostly covering the polishing cloth therewithin. The instructional insert included directions for using the polishing composition, the sponge-like applicator, and the polishing cloth to polish an automotive surface therewith. The polishing cloth was a soft, absorbent microfiber cloth comprising about 80 percent polyester microfibers and about 20 percent polyamide microfibers, and included loops of fibers on the surface thereof in a form similar to terry cloth.

Numerous variations and modifications of the embodiments described above can be effected without departing from the spirit and scope of the novel features of the invention. No limitations with respect to the specific embodiments illustrated herein are intended or should be inferred. It is intended that the appended claims cover all such modifications as fall within the scope of the claims.

We claim:
1. A liquid polishing composition consisting of:
    about 0.01 to about 3 percent by weight of silicone-based wax;
    about 0.20 to about 10 percent by weight of poly(alpha olefin) compounds including about 0.1 to about 5 percent by weight of hyperbranched poly(alpha olefin);
    about 6 to about 60 percent by weight of polydimethylsiloxane silicone fluid;
    about 1 to about 20 percent by weight of volatile cyclic silicone;
    about 0.25 to about 3 percent by weight of amino-functional silicone;
    about 0.01 to about 5 percent by weight of UV absorber;
    optionally 0.1 to about 1 percent by weight of a polydimethylsiloxane-coated polysilicate;
    optionally about 0.1 to about 5 percent by weight of a silicone-free wax;
    optionally a fragrant oil;
    optionally a preservative; and
    a petroleum-based carrier therefor;
    said percentages being based on the total weight of the composition;
    wherein:
    the silicone-based wax is one or more material selected from the group consisting of a silicone alkyl copolymer. and a graft copolymer of silicone glycol with carnauba wax;
    the silicone-free wax is one or more material selected from the group consisting of carnauba wax, montan wax, and paraffin wax; and
    the petroleum-based carrier is an anhydrous hydrocarbon fluid, or an oil in water emulsion of a hydrocarbon fluid, water and an emulsifying surfactant.

2. The liquid polishing composition of claim 1 wherein the silicone-based wax is a silicone alkyl copolymer.

3. The liquid polishing composition of claim 2 wherein the silicone alkyl copolymer is present in the polishing composition in an amount in the range of about 0.01 to about 0.5 percent by weight, based on the total weight of the composition.

4. The liquid polishing composition of claim 1 wherein the silicone-based wax is a combination of a graft copolymer of silicone glycol and carnauba wax with a silicone alkyl copolymer.

5. The liquid, polishing composition of claim 1 wherein the graft copolymer of silicone glycol and carnauba wax is present in the polishing composition in an amount in the range of about 0.005 to about 3 percent by weight, based on the total weight of the composition.

6. The liquid polishing composition of claim 1 wherein the polydimethylsiloxane silicone fluid is a mixture of polydimethylsiloxanes having kinematic viscosities in the range of about 20 to about 60,000 centistokes.

7. The liquid polishing composition of claim 6 wherein the mixture of polydimethylsiloxanes consists of about 5 to about 15 percent by weight of a polydimethylsiloxane having a kinematic viscosity of about 350 centistokes, about 0.5 to about 10 percent by weight of a polydimethylsiloxane having a kinematic viscosity of about 1,000 centistokes, about 0.5 to about 10 percent by weight of a polydimethylsiloxane having a kinematic viscosity of about 10,000 centistokes, and about 0.1 to about 2.5 percent by weight of a polydimethylsitoxane having a kinematic viscosity of about 60,000 centistokes, based on the total weight of the composition.

8. The liquid polishing composition of claim 7 wherein the polydimethylsiloxanes having kinematic viscosities of about 350, 1,000, 10,000 and 60,000 centistokes are present in the polishing composition in a respective weight ratio of about 7:3:3:1.

9. The liquid polishing composition of claim 1 wherein the volatile cyclic silicone comprises cyclopenta(dimethylsiloxane).

10. The liquid polishing composition of claim 1 wherein the amino-functional silicone is a polymer comprising repeating units represented by the general formula:

$$[-Si(R_{(2-p)})(Q_p)O-]_q[-Si(CH_3)_2O-]_y$$

wherein Q represents the radicals:

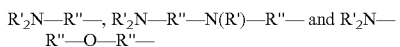

R is $C_1$-$C_{18}$ alkyl or $C_6$-$C_{10}$ aryl; R' represents hydrogen or monovalent hydrocarbon radicals having 1 to about 18 carbon atoms; R" is a substituted or unsubstituted divalent $C_1$-$C_{18}$ hydrocarbon radical, a substituted or unsubstituted divalent oxyalkylene group in which the oxygen provides an ether linkage, or an unsaturated divalent $C_4$-$C_{18}$ hydrocarbon radical; p is number having a value in the range of about 1 to about 2; q is a number having value in the range of about 1 to about 2,000; and y is a number having value in the range of about 0 to about 2,000; with the proviso that the sum of q and y is at least about 15.

11. The liquid polishing composition of claim 1 wherein the UV absorber is a mixture of $C_7$ to $C_9$ branched and linear alkyl esters of 3-(2H-benzotriazol-2-yl)-5-(1,1-dimethylethyl)-4-hydroxybenzenepropanoic acid.

12. The liquid polishing composition of claim 1 wherein the petroleum-based carrier is present in the composition in an amount in the range of about 50 to about 75 percent by weight, based on the total weight of the composition.

13. The liquid polishing composition of claim 1 wherein the composition includes butylated hydroxytoluene as a preservative.

14. The liquid polishing composition of claim 1 wherein the petroleum-based carrier is an anhydrous hydrocarbon fluid.

15. The liquid polishing composition of claim 1 wherein the petroleum-based carrier is an emulsion of a hydrocarbon fluid, water, and an emulsifying surfactant.

16. A polishing kit comprising the following components packaged together: (a) a liquid polishing composition in a sealed container, (b) at least one microfiber polishing cloth comprising polyester and polyamide microfibers, and (c) instructional indicia describing how to polish an automotive surface therewith; the liquid polishing composition consisting of:
  (i) about 0.01 to about 3 percent by weight of silicone-based wax;
  (ii) about 0.20 to about 10 percent by weight of poly(alpha olefin) compounds including about 0.1 to about 5 percent by weight of hyperbranched poly(alpha olefin);
  (iii) about 6 to about 60 percent by weight of polydimethylsiloxane silicone fluid;
  (iv) about 1 to about 20 percent by weight of volatile cyclic silicone;
  (v) about 0.25 to about 3 percent by weight of amino-functional silicone;
  (vi) about 0.01 to about 5 percent by weight of UV absorber;
  optionally 0.1 to about 1 percent by weight of a polydimethylsiloxane-coated polysilicate;
  (vii) optionally about 0.1 to about 5 percent by weight of a silicone-free wax;
  (viii) optionally a fragrant oil;
  (ix) optionally a preservative; and;
  (x) a petroleum-based carrier therefor;
  said percentages being based on the total weight of the composition;
  wherein:
  the silicone-based wax is one or more material selected from the group consisting of a silicone alkyl copolymer, and a graft copolymer of silicone glycol with carnauba wax;
  the silicone-free wax is one or more material selected from the group consisting of carnauba wax, montan wax, and paraffin wax; and
  the petroleum-based carrier is an anhydrous hydrocarbon fluid, or an oil in water emulsion of a hydrocarbon fluid, water and an emulsifying surfactant.

17. The kit of claim 16 wherein the silicone-based wax is a silicone alkyl copolymer.

18. The kit of claim 16 wherein the polydimethylsiloxane silicone fluid consists of a mixture of polydimethylsiloxanes including about 5 to about 15 percent by weight of a polydimethylsiloxane having a kinematic viscosity of about 350 centistokes, about 0.5 to about 10 percent by weight of a polydimethylsiloxane having a kinematic viscosity of about 1,000 centistokes, about 0.5 to about 10 percent by weight of a polydimethylsiloxane having a kinematic viscosity of about 10,000 centistokes, and about 0.1 to about 2.5 percent by weight of a polydimethylsiloxane having a kinematic viscosity of about 60,000 centistokes, based on the total weight of the composition.

19. The kit of claim 16 wherein the amino-functional silicone is a polymer comprising repeating units represented by the general formula:

$$[-Si(R_{(2-p)})(Q_p)O-]_q[-Si(CH_3)_2O-]_y$$

wherein Q represents the radicals:

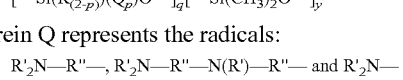

R is $C_1$-$C_{18}$ alkyl or $C_6$-$C_{10}$ aryl; R' represents hydrogen or monovalent hydrocarbon radicals having 1 to about 18 carbon atoms; R" is a substituted or unsubstituted divalent $C_1$-$C_{18}$ hydrocarbon radical, a substituted or unsubstituted divalent oxyalkylene group in which the oxygen provides an ether linkage, or an unsaturated divalent $C_4$-$C_{18}$ hydrocarbon radical; p is number having a value in the range of about 1 to about 2; q is a number having value in the range of about 1 to about 2,000; and y is a number having value in the range of about 0 to about 2,000; with the proviso that the sum of q and y is at least about 15.

20. The kit of claim 16 wherein the petroleum-based carrier is an anhydrous hydrocarbon fluid.

21. The kit of claim 16 wherein the petroleum-based carrier is an emulsion of a hydrocarbon fluid, water, and an emulsifying surfactant.

22. The kit of claim 16 wherein the kit further comprises (d) an absorbent applicator.

* * * * *